United States Patent [19]

Enomoto et al.

[11] 4,162,167

[45] Jul. 24, 1979

[54] PROCESS AND AN APPARATUS FOR PRODUCING SILICON CARBIDE CONSISTING MAINLY OF BETA-TYPE CRYSTAL

[75] Inventors: Ryo Enomoto, Ohgaki; Mitihiro Yoshioka, Yoro; Takao Yokoyama, Ohgaki, all of Japan

[73] Assignee: Ibigawa Electric Industry Co., Ltd., Gifu, Japan

[21] Appl. No.: 797,609

[22] Filed: May 16, 1977

[30] Foreign Application Priority Data

May 24, 1976 [JP] Japan ................................. 51-60501
May 26, 1976 [JP] Japan ................................. 51-61432

[51] Int. Cl.$^2$ ....................... C04B 35/56; C01B 31/36
[52] U.S. Cl. ........................................ 106/44; 423/345
[58] Field of Search ............................. 423/345; 106/44

[56] References Cited

U.S. PATENT DOCUMENTS 2,178,773  11/1939  Benner et al. ...................... 423/345

Primary Examiner—O. R. Vertiz
Assistant Examiner—Mark Bell
Attorney, Agent, or Firm—Stevens, Davis, Miller & Mosher

[57] ABSTRACT

A process and an apparatus for producing silicon carbide consisting mainly of $\beta$-type crystal are disclosed. The fine silicon carbide consisting mainly of $\beta$-type crystal is produced by charging the starting material of silica and carbon with a mole ratio of $C/SiO_2$ of 3.2–5.0 into a top portion of a vertical-type reaction vessel having a preheating zone, a heating zone and a cooling zone in this order, descending the starting material by gravity through the reaction vessel, heating the starting material in the heating zone at a temperature of 1,600°–2,100° C. by electrically indirect heating in horizontal direction to effect the formation of SiC, cooling the resulting reaction product in the cooling zone under a non-oxidizing atmosphere, and recovering the cooled product from the bottom portion of the reaction vessel to obtain a product having a composition ratio by weight of silicon carbide, silica and free carbon which lies within the area represented by the area ABCD shown in FIG. 1 of the accompanying drawings.

6 Claims, 9 Drawing Figures

PROCESS AND AN APPARATUS FOR PRODUCING SILICON CARBIDE CONSISTING MAINLY OF BETA-TYPE CRYSTAL

The present invention relates to a process and an apparatus for producing silicon carbide consisting mainly of $\beta$-type crystal, and more particularly to a process and an apparatus for continuously producing fine silicon carbide consisting of $\beta$-type crystal industrially and cheaply.

The fine silicon carbide of $\beta$-type crystal has a particle size considerably smaller than that of $\alpha$-type silicon carbide and an approximately spherical form and possesses an excellent oxidation resistance and a high mechanical strength as compared with $\alpha$-type silicon carbide. Owing to these properties, the fine powders of $\beta$-type silicon carbide can be used as a raw material for high density silicon carbide ceramic, a filler or coating material for improving an oxidation resistance of silicon carbide refractory, an additive for improving a corrosion resistance of amorphous refractory, an abrasive material for precision working of metal and ceramic, a deoxidizing agent for molten cast iron, a silicon source for chemicals, and the like.

Up to now, the silicon carbide is produced by means of an Acheson-type electric furnace. In this case, however, the fine powders of $\beta$-type silicon carbide are obtained in a very small amount around an ingot consisting of $\alpha$-type silicon carbide and have a high content of impurities such as $\alpha$-type silicon carbide, aluminum, iron and the like. Thus, it is very difficult to industrially produce uniform and fine powders of $\beta$-type silicon carbide on a large scale.

The Acheson method is a batch type and has the following drawbacks; the many manual operations are required for the charging of starting materials, the recovery of the resulting product, the separation of the product from the unreacted materials and also the operation environment is very poor. Furthermore, the temperature rising and cooling take a long time, so that the working efficiency of the furnace is low and also the energy efficiency is poor. Moreover, the closing of the furnace is difficult, so that the environmental pollution is apt to be caused. Even if the furnace is closed, CO gas cannot be continuously generated, so that the recovery and utilization of CO gas are difficult.

Hitherto, there have been proposed many processes for continuously producing silicon carbide. For instance, there are disclosed a direct heating system by electric current in Japanese Pat. No. 118,365, the use of graphite reaction column itself as a heating element in U.S. Pat. No. 1,675,744 and an induction heating system in U.S. Pat. No. 2,178,773. In these patents, however, there is no means for controlling the reaction, so that the block-like product is obtained and the continuous production becomes impossible and hence the processes described in these patents are not practised industrially. In U.S. Pat. No. 2,729,542, there is disclosed a process for continuously producing $\alpha$-type silicon carbide wherein the starting material is charged into a graphite container and then the container is transferred in a tubular furnace, but a great amount of heat is required for heating the container and the waste of the container is conspicuous due to the adherence of the product to the container wall, so that this process is under experiment and is not yet practised.

Furthermore, in German Pat. No. 1,186,447, there are disclosed that in order to continuously produce the $\alpha$-type silicon carbide, the starting material is treated by coating silica sand with powdery carbonaceous material and that the $\beta$-type silicon carbide is continuously obtained by using a vertical-type furnace in the course of the production of $\alpha$-type silicon carbide. In this process, however, a large amount of SiO gas is discharged from a vent hole located in the reaction zone of the furnace. Such discharge of SiO gas not only reduces the yield on the starting material and the quality of the reaction product, but also is accompanied with emissions of heat of formation of SiO gas and sensible heat of CO gas, so that the heat efficiency considerably lowers. Furthermore, the passage of the vent hole is clogged by the deposition of SiO gas at ambient temperature during the discharge, so that a stable operation for a long time becomes impossible. Moreover, only a single-side heating is performed due to the presence of the vent hole in the furnace, so that the thickness of the product layer is as thin as about 3–5 cm per one hour. Therefore, the process of this patent can barely be carried out only by using a small-sized furnace and is not suitable in mass production.

In U.S. Pat. No. 3,375,073, there is disclosed a process wherein the starting material is shaped into an elongate tube form and then reacted in a suspended state. In this process, however, the strength of the shaped body considerably lowers with the progress of the reaction, so that it is very difficult to retain the desired shape of the product while supporting its dead weight.

As mentioned above, there has not yet been known a process and an apparatus for continuously producing fine powders of $\beta$-type silicon carbide in economical and industrial scale.

It is, therefore, an object of the present invention to provide a process for producing fine silicon carbide consisting mainly of $\beta$-type crystal wherein a stable and continuous operation is held with a high heat efficiency and a low unit power for a long time.

It is another object of the present invention to provide an apparatus suitable for producing fine silicon carbide consisting mainly of $\beta$-type crystal in industrial scale.

According to the present invention, there is provided a process for producing fine silicon carbide consisting mainly of $\beta$-type crystal, which comprises preparing a starting material by blending silica and carbon in a mole ratio of $C/SiO_2$ of 3.2–5.0; charging the starting material into a top portion of a vertical-type reaction vessel having a preheating zone, a heating zone and a cooling zone in this order; descending the charged starting material by gravity through the reaction vessel; heating the starting material in the heating zone at a temperature of 1,600°–2,100° C. by an electrically indirect heating in horizontal direction to effect the formation of silicon carbide; cooling the resulting reaction product in the cooling zone under a non-oxidizing atmosphere; and then recovering the cooled product from the bottom portion of the reaction vessel to obtain a product having a composition ratio by weight of silicon carbide, silica and free carbon which lies within the area represented by the area ABCD shown in FIG. 1 of the accompanying drawings. Further, the present invention provides an apparatus for producing fine silicon carbide consisting mainly of $\beta$-type crystal, comprising a vertical-type reaction vessel having an inlet for a starting material, a preheating zone, a heating zone, a cooling zone and a closable outlet for a product in this order, and a heating means for the starting material in the heating zone by an electrically indirect heating; said heating zone being made of a graphite cylinder and having an effective heating width of 0.10-0.35 m; and further comprising a heat insulating layer composed of fine powder of carbon and/or graphite and arranged on at least outside of the heating zone.

The invention will now be described in greater detail with reference to the accompanying drawings, wherein.

Like parts are designated by like numerals throughout the different figures of the drawing.

Figure 1:
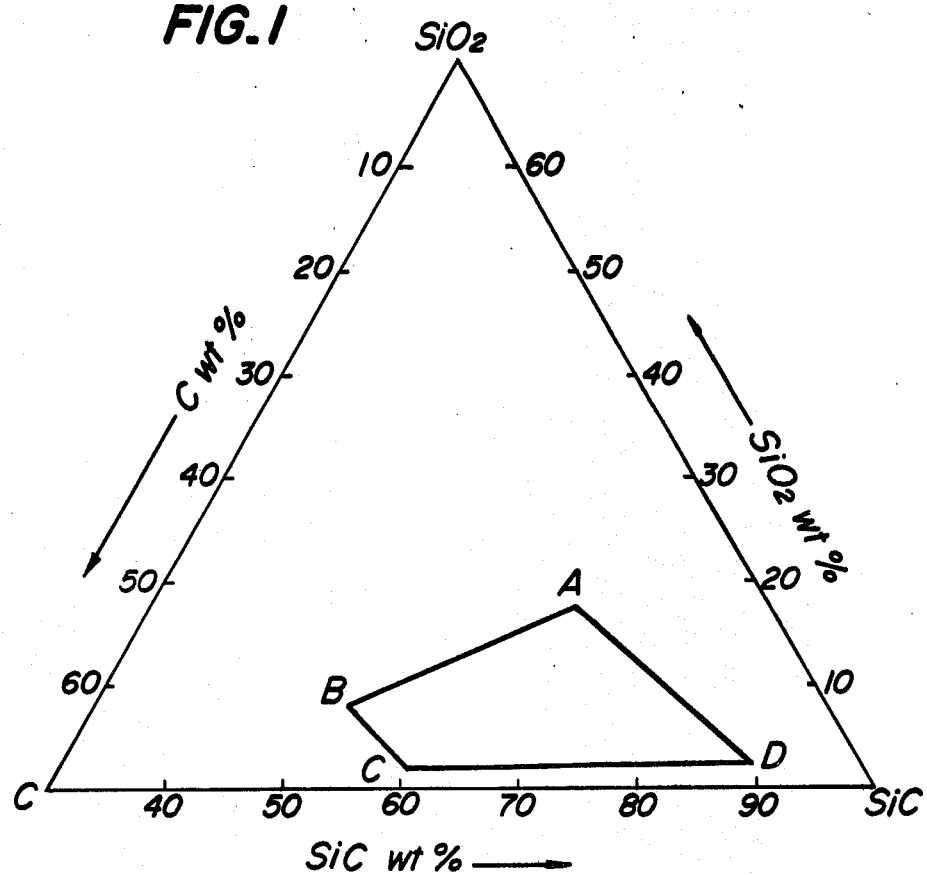
FIG. 1 is a triangular diagram showing a composition ratio by weight of silicon carbide, silica and free carbon in the product according to the present invention.

In general, silicon carbide is produced from silica and carbon according to the following equation:

$$SiO_2 + 3C \rightarrow SiC + 2CO(gas) \quad (1)$$

However, it is known that the actual formation of silicon carbide is caused according to the following equations:

$$SiO_2 + C \rightarrow SiO(gas) + CO(gas) \quad (2)$$

$$SiO(gas) + 2C \rightarrow SiC + 2CO(gas) \quad (3)$$

According to the present invention, silica and carbon are also used as the starting material. In the preparation of the starting material, if the blending ratio of carbon to silica is approximately equal to or smaller than the stoichiometric quantity as in the conventional process for the production of α-type silicon carbide using an Acheson furnace, a part of SiO gas generated by the equation (2) may not react with carbon, i.e. the complete equilibrium according to the equation (3) is not maintained, so that the amount of SiO gas increases in the furnace. As a result, semi-melts such as $SiO_2$, SiC, Si, C and the like are considerably deposited from SiO gas at a lower temperature region according to the following equations:

$$2SiO(gas) \rightarrow SiO_2(solid) + Si(solid) \quad (4)$$

$$SiO(gas) + CO(gas) \rightarrow SiO_2(solid) + C(solid) \quad (5)$$

$$3SiO(gas) + Co(gas) \rightarrow 2SiO_2(solid) + SiC(solid) \quad (6)$$

Consequently, the starting material is aggregated due to the adhesion of such deposits, so that the smooth descending movement of the starting material, which is a most important factor for the continuous production of silicon carbide, is considerably obstructed and the long-time stable and continuous operation becomes impossible.

According to the present invention, the starting material is prepared by blending carbon and silica in such an amount that the mole ratio of $C/SiO_2$ is within a range of 3.2-5.0. When the mole ratio is less than 3.2, it is difficult not only to sufficiently react silica with carbon, but also to maintain the smooth descending movement of the starting material over a long time as mentioned above. While, when the mole ratio exceeds 5.0, carbon contributing not to the reaction is heated at an elevated temperature, so that the heat efficiency lowers and also the cost required for carbon source increases and hence it is difficult to economically produce the β-type silicon carbide. Moreover, a best result can be obtained with the mole ratio of 3.5-4.5.

The reason why it is difficult to continuously produce silicon carbide by the conventional process is due to the following facts. Firstly, the smooth descending movement of the starting material is obstructed as the amount of semi-melts deposited from SiO gas increases. Secondarily, the resulting fine powders of β-type silicon carbide are further heated at an elevated temperature to cause a crystal growth and hence transformed into an α-type silicon carbide. That is, according to the conventional process, crystal particles produced by the crystal growth and by the transformation into α-type crystal adhere to the inner wall of the reaction vessel or bond with each other to form agglomerates. As a result, the flow of the resulting product is obstructed and also the recovery of the product is difficult.

According to the present invention, the starting material having the mole ratio of $C/SiO_2$ of 3.2-5.0 is charged into a top portion of the reaction vessel and continuously or intermittently descended through a preheating zone into a heating zone by gravity, where the starting material is heated at a temperature of 1,600°-2,100° C. by an electrically indirect heating in horizontal direction to effect the formation of silicon carbide. When the reaction temperature exceeds 2,100° C., the resulting β-type silicon carbide is transformed into an α-type crystal, so that the continuous operation cannot be effected. While, when the reaction temperature is lower than 1,600° C., SiO gas is generated according to the equation (2), but the formation of SiC according to the equation (3) is very slow, so that it is very difficult to produce the objective β-type silicon carbide and also the amount of SiO gas generated increases in the reaction vessel to obstruct the smooth descending movement of the starting material. Therefore, the reaction temperature must be within a range of 1,600°-2,100° C. and a best result can be obtained within a range of 1,650°-1,900° C. In this case, it is advantageous that the outer wall surface of the reaction vessel is maintained at a temperature of about 100°-350° C. higher than the reaction temperature.

In order to uniformly and accurately hold the starting material at the above mentioned heating temperature, it is necessary that the filling width (l) of the starting material in the heating zone is within a range of 0.10-0.35 m. When the width is larger than 0.35 m, the temperature difference in horizontal direction becomes large and hence the product having a uniform reaction rate is hardly obtained, while when the width is smaller than 0.10 m, the starting material is apt to be hanged with each other, so that the descending movement is poor and the production yield is low.

The reaction time for effecting the formation of SiC can be controlled by the descending rate U (m/hr) of the starting material at the inlet of the heating zone. According to the present invention, it is preferable that the formation of SiC is carried out at the reaction temperature so as to satisfy the descending rate expressed by the following equation:

$$\exp(-7.16l+0.39) \leq U \leq \exp(-4.63l+1.72) \tag{7}$$

When the descending rate is faster beyond the upper limit of the equation (7), the reaction degree for the formation of SiC lowers, so that not only the amount of SiC in the product decreases, but also the consumption of unit power increases. While, when the descending rate is slower beyond the lower limit of the equation (7), the formation of SiC is completed in the course of the heating zone, the heat dissipation ratio and the amount of sensible heat in the product increase and the unit power becomes higher. Moreover, the equation (7) is established when the height of the heating zone is within a range of 0.3–3.5 m.

The thus obtained product consisting mainly of $\beta$-type silicon carbide is descended into a cooling zone, where the product is cooled below about 1,500° C., preferably below about 1,000° C. when a non-oxidizing atmosphere selected from CO gas produced according to the equation (1), hydrogen gas, nitrogen gas, $CO_2$ gas and inert gas such as argon, helium or the like. Then, the cooled product is continuously or intermittently recovered from the bottom portion of the cooling zone. The feature that the product is cooled in the reaction vessel is to prevent the oxidation of SiC in air as far as possible.

According to the present invention, the product obtained by the reaction of the starting material having the mole ratio of $C/SiO_2$ of 3.2–5.0 has a composition ratio of silicon carbide, silica and free carbon on a weight basis which lies within the area represented by the area ABCD shown in FIG. 1. In this figure, the point A represents a composition of 66.0% of SiC, 17.5% of $SiO_2$ and 16.5% of C, the point B a composition of 51.5% of SiC, 8.0% of $SiO_2$ and 40.5% of C, the point C a composition of 59.5% of SiC, 2.0% of $SiO_2$ and 38.5% of C, and the point D a composition of 88.5% of SiC, 2.5% of $SiO_2$ and 9.0% of C. When the silica content of the product is below the point C, the reaction degree for the formation of SiC reaches approximately to 100% in the course of the heating zone, so that the heat applied at the remaining zone is only consumed for heating the product. As a result, the temperature of the product rapidly rises and the crystal growth and the transformation into $\alpha$-type crystal are caused as mentioned hereinbefore to obstruct the descending movement of the product, so that the continuous operation becomes very difficult. Furthermore, the quantity of sensible heat in the product and the heat dissipation ratio increase, so that the unit power becomes larger. While, when the silica content in the product is beyond the point A, not only the yield of $\beta$-type silicon carbide lowers, but also the quantity of heat consumed for the heating of the starting material increases and the unit power is large. In the extreme circumstances, the heating temperature drops and only the amount of SiO gas generated increases, so that the continuous operation becomes difficult.

According to the present invention, the reason why the composition ratio of the product is limited to the area ABCD shown in FIG. 1 is as follows. That is, when the composition ratio is within the area ABCD, the phenomenon of obstructing the descending movements of the starting material and the product due to the deposition of SiO gas and the aggregation of the product is prevented, so that the stable operation can be accomplished for a long time. Furthermore, the improvement of the unit power and the productivity is attempted, so that the objective $\beta$-type silicon carbide is obtained economically.

As the starting material composed of silica and carbon, use may be made of a mixture of granular silica and granular carbon and pellets or briquettes shaped from a mixture of powdery silica and powdery carbon. It is preferable that the use of either the former or the latter is selected by the kind of the carbonaceous material to be used as a carbon source. Namely, when charcoal or wood chip having a high porosity and a low bulk specific gravity is used as the carbonaceous material, any of granular and powdery forms can be adopted, but the use of the granular form is advantageous economically. On the other hand, when coke or coal having a low porosity and a high bulk specific gravity is used as the carbonaceous material, if the granular form is adopted, the reactivity is poor, so that the deposition of SiO gas is violent and the charged starting material is apt to form a large aggregate as a whole by the fusing and sintering of each of silica granules in the reaction vessel and as a result the smooth descending movement of the starting material is obstructed. Therefore, it is advantageous that the coke or coal is used in the powdery form so as to form pellets or briquettes with the powdery silica.

In case of using the mixture of granular charcoal and/or wood chip and granular silica, if the particle size is too small, the gas permeability is poor, while if the particle size is too large, the reaction takes a long time and this particle size is uneconomical. Therefore, the average particle size of the granular silica should be within a range of 3–10 mm and that of the granular charcoal should be within a range of 2–8 mm and that of the granular wood chip should be within a range of 5–15 mm considering the shrinkage due to carburization.

In case of using the pellets or briquettes made from powdery silica and powdery carbon, it is preferable that silica powder is homogeneously mixed with carbon powder having an average particle size of not more than 147 microns and a weight ratio of ash to carbon of not more than 0.07 and then the resulting mixture is shaped into briquettes having an average particle size of 3–18 mm. The reason why the average particle size of carbon powder is limited to not more than 147 microns is based on the fact that the surface area and surface activity of the carbonaceous material are increased by the pulverization and also the reactivity to SiO gas is improved. Further, the reason why the weight ratio of ash to carbon is limited to not more than 0.07 is based on the fact that the impurities contained in the ash such as Mg, Ca, Zn, Fe, Al, Na and the like are reduced in the heating zone to form gases, a part of which is deposited in the preheating zone to obstruct the smooth descending movement of the starting material and the other is contained in the resulting silicon carbide. Moreover, the reason why the average particle size of the pellets or briquettes is limited to the range of 3–18 mm is based on the fact that when the average particle size is less than 3 mm, the gas permeability is poor and SiO gas is scattered from the pellets or briquettes to obstruct the smooth descending movement of the starting material, while when the average particle size is more than 18 mm, the formation of SiC takes a long time and is uneconomical.

As the carbon powder, use may be made of pulverized carbonaceous materials containing less ash, such as petroleum coke, pitch coke, anthracite, charcoal, brown coal and the like; carbon black, acetylene black, lamp black, furnace black and the like. The silica powder is preferable to have a high quality as far as possible and includes, for example, quartz, silica, silica sand, diatomaceous earth, amorphous silica and the like.

As the binder for the formation of pellets or briquette, use may be made of, for example, methylcellulose, polyvinyl alcohol, corn starch, polyvinyl acetate, phenolic resin, tar, pitch, asphalt, ligninsulfonic acid and other liquid or solid binders. Among them, the use of binders having a high carburization ratio such as tar, pitch, ligninsulfonic acid and the like is advantageous because the high strength in the pellets or briquette of the starting material is hold at an elevated temperature zone. These binders are added in the form of liquid or solid (particularly, powder) during the mixing of the silica powder and the carbon powder or during the shaping of the pellet or briquette.

According to the present invention, in order to improve the gas permeability of the starting material and the undesirable phenomenon due to SiO gas as mentioned above, at least one of wood chip, rice hull, coconut shell, cocoa shell, charcoal granule, coke granule and coal granule may be added to the pellet or briquette of the starting material. However, the use of wood powder having a fine particle size is apt to cause the inverse action and is undesirable.

The rough reaction product obtained by the process of the present invention can be used for various applications as it is or by simple pulverization and if necessary, it may be subjected to removal of free carbon, removal of residual silica, pulverization, classification of particle size or other treatment.

Figure 2:
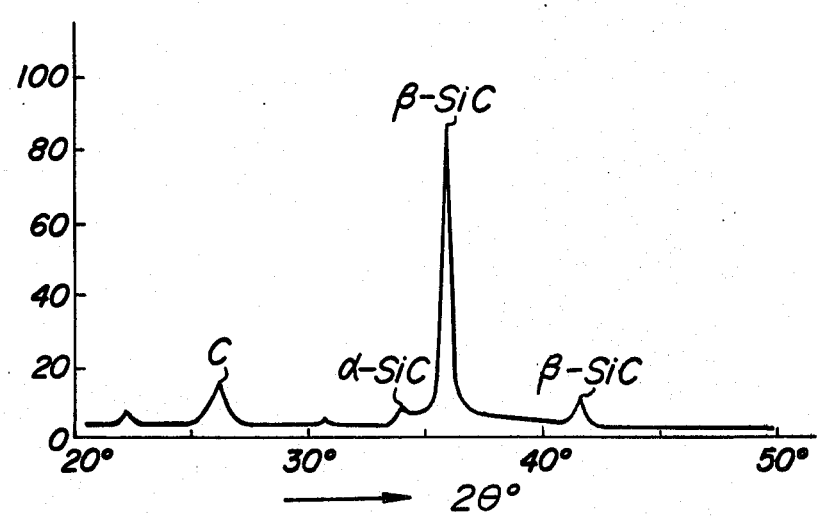
FIG. 2 is an X-ray diffraction pattern of the product obtained by the process of the present invention.

The silicon carbide consisting mainly of β-type crystal and produced by the process of the present invention is β-type crystal belonging to a cubic system and containing a trace amount of α-type silicon carbide as seen from the result of X-ray diffraction shown in FIG. 2, wherein the content of β-type silicon carbide is not more than 10%, usually within a range of 3–7%.

When the silicon carbide product is observed by a scanning-type electron microscope, the shape of the silicon carbide according to the present invention is mostly a roundish sphere or oval different from the shape of α-type silicon carbide such as plate, wedge, needle or the like. Further, the silicon carbide according to the present invention has a primary particle size of not more than 15 microns, usually 1–5 microns and is frequently existent in the aggregated state.

The apparatus used for practising the process of the present invention will be described with reference to FIGS. 3–8.

Figure 3:
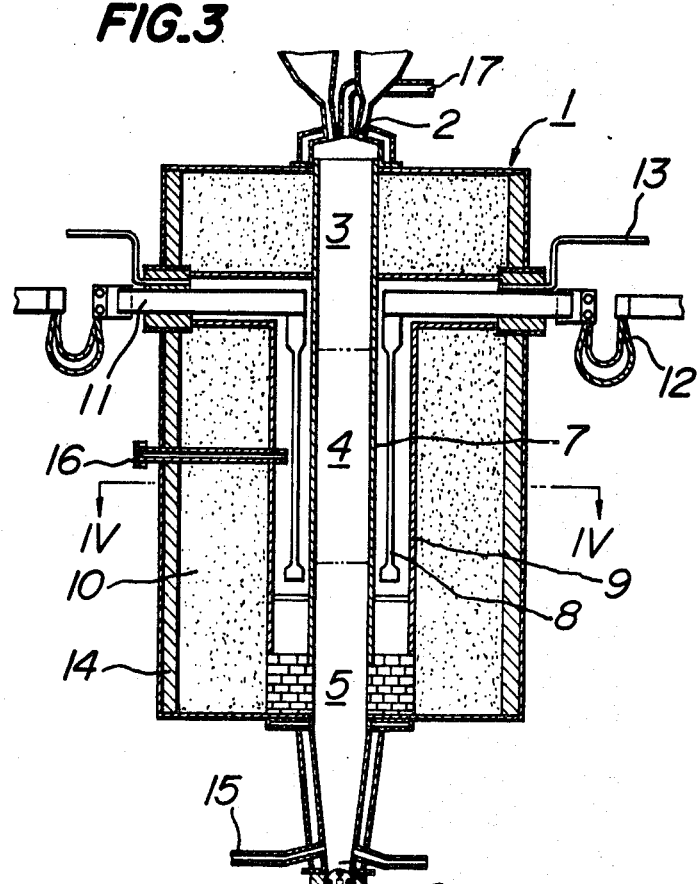
FIG. 3 is a longitudinal sectional view of an embodiment of the apparatus according to the present invention.

Referring to FIG. 3, the apparatus of the present invention comprises a reaction vessel 1 having an inlet 2 for the starting material, a preheating zone 3, a heating zone 4, a cooling zone 5 and a closable outlet 6 for the product, which being communicated with each other in this order in a vertical direction. The heating zone 4 is made of a graphite cylinder 7 and further provided with a heating means (8, 9) for indirectly and electrically heating the starting material charged into the heating zone 4. The effective heating width of the heating zone 4 is within a range of 0.10–0.35 m. A heat insulating layer 10 composed of fine powder of carbon and/or graphite is arranged on at least outside of the heating zone 4.

According to the present invention, the starting material for the production of silicon carbide is continuously or intermittently charged into the top portion of the preheating zone 3 through the inlet 2, where the starting material is preheated while being continuously or intermittently descended by gravity into the heating zone 4. In the heating zone 4, the preheated starting material is indirectly heated by the heating means (8, 9) to effect the formation of SiC. Then, the resulting reaction product is cooled in the cooling zone 5 while being descended by gravity and thereafter recovered from the outlet 6 to obtain the product consisting mainly of β-type silicon carbide.

Figure 4:
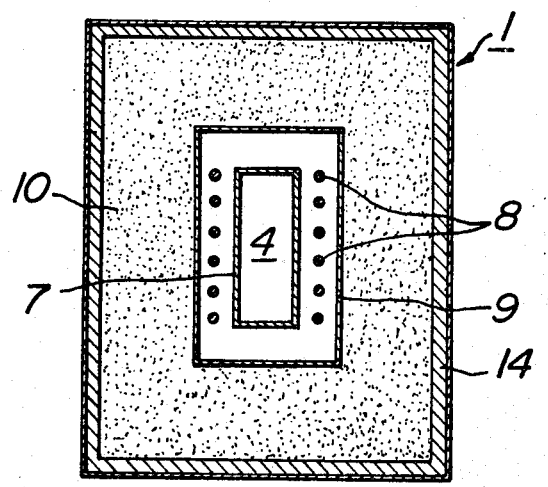
FIG. 4 is a transverse sectional view taken along a line IV—IV of FIG. 3.

The apparatus of the present invention will be described in greater detail. As shown in FIG. 4, which is a horizontal cross section taken along a line IV—IV of FIG. 3, the cylinder 7 defining the heating zone 4 has at least one pair of parallel lines in the inner wall surface. The distance between these parallel lines is within a range of 0.10–0.35 m. Further, the heating means for electrically indirect heating comprises one or more of graphite heating elements 8 vertically disposed outside the cylinder 7 defining the heating zone, and a graphite reflective cylinder 9 arranged near the outside of the heating elements and inside the heat insulating layer 10.

In the reaction vessel 1, it is necessary that the cylinder 7 defining the heating zone 4 is made of graphite as mentioned above, but the preheating zone 3 and the cooling zone 5 are not necessarily of graphite and may be constituted with refractory bricks or amorphous refractorys.

As shown in FIG. 4, there are at least one pair of parallel lines in the horizontal cross section of the cylinder 7 and in this case, the distance between the paralle lines, i.e. the effective heating width is necessary to be within a range of 0.10–0.35 m. When the effective heating width is larger than 0.35 m, the reaction temperature difference in the heating direction (horizontal direction) of the heating zone becomes large and it is difficult to obtain a uniform reaction product, while when the width is smaller than 0.10 m, the charged starting material is apt to be hanged with each other, so that the descending movement is poor and the production yield is low.

The vertical length, i.e. height of the heating zone 4 is preferable to be within a range of 0.3–3.5 m. When the height is less than 0.3 m, the descending rate of the starting material must be reduced so that the productivity is low and the uniform heating is hardly effected, while when the height is more than 3.5 m, the manufacture of the graphite cylinder 7 is difficult and the resident time of the generated gas becomes longer.

When the height of the preheating zone 3 is too short, the heat efficiency is poor, while when the height is too long, there is apt to cause problems relating to the deposition of SiO gas and the behavior of impurities as mentioned above. Therefore, the height of the preheating zone 3 is preferable to be selected within a range of 0.3–1.5 m.

Moreover, the thickness of the graphite cylinder 7 is preferable to be within a range of 15–90 mm. When the thickness is less than 15 mm, the mechanical strength is low and the durability is poor, while when the thickness is more than 90 mm, large temperature difference is caused between the inner and outer surfaces of the cylinder and the cylinder is apt to be broken as the result of the expansion and shrinkage due to the heat.

In the heating zone 4, the starting material is indirectly heated by the heating means composed of the graphite heating elements 8 and the graphite reflective cylinder 9. The graphite heating elements 8 are vertically arranged adjacent to the outer periphery of the cylinder 7 in such a manner that the heating portion of the heating element corresponds to the heating zone in the vertical direction. The graphite reflective cylinder 9 is vertically arranged adjacent to the outside of the heating elements 8 and inside the heat insulating layer 10.

The graphite heating element 8 may be used in the form of bar, U-shape, ribbon or the like. One or more of these elements are arranged adjacent to the outer periphery of the heating zone 4 so as to uniformly heat the charged starting material as far as possible. The heating element 8 is connected to a power source (not shown) through a guide electrode 11 and a flexible knob bar 12. Thus, the electric current supplied by the guide electrode 11 is converted into a heat at the heating portion of the heating element 8, so that a part of heat generated is directly transferred into the cylinder 7 and the remaining heat is reflected by the graphite reflective cylinder 9 toward the cylinder 7, whereby the charged starting material is heated. In this case, the effective heating width is set at an appropriate length and the heating is carried out from both the outer surfaces of the cylinder 7, so that the charged starting materials is uniformly heated in the heating zone 4.

The graphite heating element 8 is existent in a space between the cylinder 7 defining the heating zone 4 and the graphite reflective cylinder 9. Therefore, the oxidation waste of the graphite heating element due to penetration of air can be prevented by introducing a non-oxidizing gas such as argon, helium, nitrogen, carbon monoxide, hydrogen and the like into the space through a gas inlet 13.

As shown in FIG. 3, the heat insulating layer 10 composed of fine powder of carbon and/or graphite is formed outside at least the heating zone 4 and around the graphite reflective cylinder 9, whereby the diffusion of heat toward exterior is prevented. Around the heat insulating layer 10 is provided an outer shell wall 14 consisting of one or more of metal plates, refractorys and/or thermal insulation materials other than fine carbon or graphite powder, whereby the heat insulating layer 10 is fixed.

According to the present invention, it is advantageous that the charged starting material is indirectly heated at 1,600°-2,100° C. required for the formation of SiC so that the maximum temperature at the outside of the heating zone is maintained at about 100°-350° C. higher than the above reaction temperature. Therefore, it is necessary that the material as the heat insulating layer 10 is durable to the above higher temperature, does not react with graphite even if contacting therewith, and suppresses heat conduction as far as possible. From this reason, the fine powder of carbon and/or graphite is used. The fine powder includes ones of coke, natural graphite, artificial graphite, baked anthracite and the like; carbon black, lamp black, acetylene black, furnace black and the like. Among them, carbon black, acetylene black and the like are excellent in the thermal insulating property at high temperature region and are found to be useful in the present invention. Further, it is advantageous that the thickness of the heat insulating layer 10 composed of fine powder of carbon and/or graphite is not less than 0.10 m.

The inlet 2 for the starting material may be any one of open-type, gas seal-type and open-type only in the charging of the starting material. When the reaction product is continuously or intermittently taken out from the outlet 6 located at the bottom portion of the cooling zone 5, it is necessary to prevent the penetration of air into the reaction vessel 1 through the outlet 6 as far as possible and not to exhaust a large amount of CO gas and SiO gas generated in the reaction vessel 1 through the outlet 6 outside the reaction vessel, so that the closable type outlet is used. Therefore, the recovery of the product and the gas sealing may be carried out by the same or different means.

In the recovery of the product, there may be used rotary-type, roller-type, table-type, screw-type or other commonly used means. Moreover, it is preferable to recover the reaction product so as to descend the starting material charged in the reaction vessel and the reaction product at a uniform rate in horizontal direction.

According to the present invention, the reaction product is usually cooled in the cooling zone 5 by natural heat dissipation or by forced water cooling. Further, the product may be cooled by introducing a non-oxidizing gas such as carbon monoxide, argon, hydrogen, nitrogen and the like into the cooling zone 5 through an inlet 17 located at the outlet 6 or the lower portion of the cooling zone 5. The cooling of the product by the non-oxidizing gas is preferable in view of the fact that the sensible heat of the product is transferred into the heating zone 4 to improve the consumption of unit power and the penetration of air into the reaction vessel 1 is prevented. As the non-oxidizing gas to be introduced into the cooling zone 5, a part of CO gas recovered at the top portion of the reaction vessel is advantageously used by circulation.

When the starting material is indirectly heated at a temperature of 1,600°-2,100° C. to effect the formation of SiC, the reaction temperature can be controlled by measuring the temperature on or near the outer wall of the graphite cylinder 7 defining the heating zone 4 and adjusting the power to be used in accordance with the measured temperature.

In order to measure the temperature on or near the outer wall of the graphite cylinder 7, an optical pyrometer, a radiation pyrometer, a two-color pyrometer, a thermoelectric thermometer composed of, for example, tungsten/iridium or other high temperature thermocouple and the like may be used in a temperature-sensing pipe 16 closed or opened at one end. Moreover, it is advantageous that the temperature on the outer wall of the graphite cylinder 7 is about 100°-350° C. higher than the reaction temperature.

Figure 5:
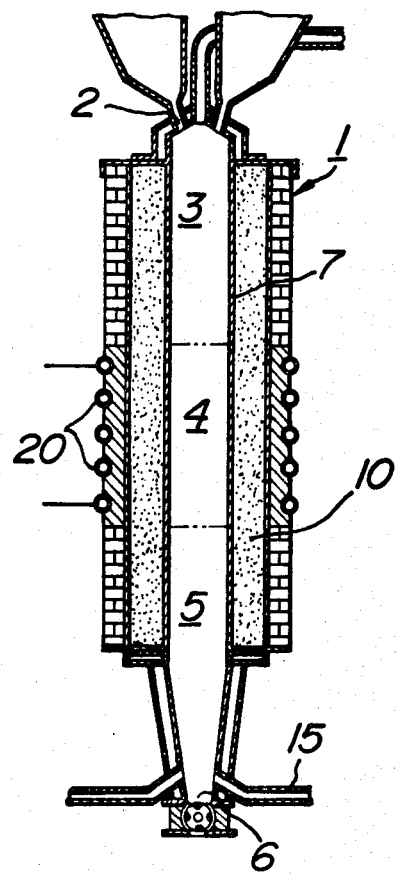
FIG. 5 is a longitudinal sectional view of another embodiment of the apparatus according to the present invention.

As the heating means, an electrically indirect heating means composed of an induction coil 20 as shown in FIG. 5 may be used in addition to the heating means composed of the graphite heating element 8 and the graphite reflective cylinder 9. In this case, the graphite cylinder 7 defining the heating zone is inducedly heated through the heat insulating layer 10 by the induction coil 20.

The induction coil 20 is made of a water-cooled copper pipe and is arranged outside the heat insulating layer 10 so as to uniformly heat the graphite cylinder 7 defining the heating zone as far as possible and is connected to an alternating power source. The electric current supplied from the power source changes the magnetic field through the induction coil 20 to inducedly heat the graphite cylinder 7, whereby the starting material charged into the cylinder 7 is indirectly heated.

Figure 6:
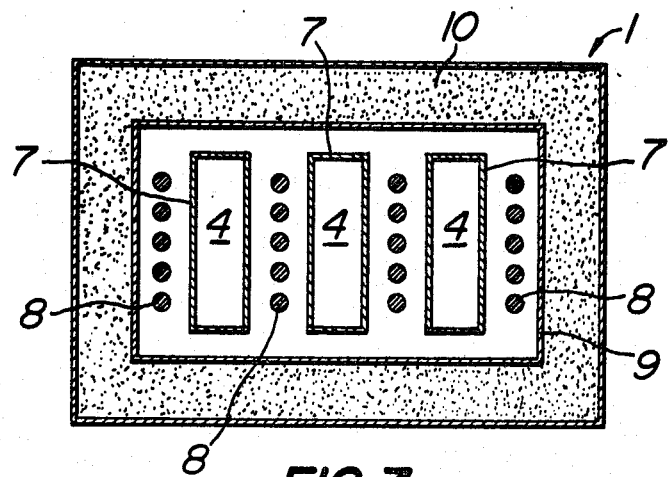
FIGS. 6-8 are transverse sectional views of other embodiments of the apparatus according to the present invention, respectively.

According to the present invention, two or more of the heating cylinders 7 having at least one pair of parallel lines in the inner wall surface may be placed side by side in the horizontal section of the heating zone as shown in FIG. 6. In this case, the area of the starting material charged in the heating zone can be made large though the effective heating width is limited to the range of 0.10–0.35 mm, so that the mass production is advantageously achieved. In the placement of these cylinders 7, it is preferable to arrange the heat insulating layer 10 around the common outermost shell of the cylinders so as to prevent the heat dissipation as far as possible.

Figure 7:
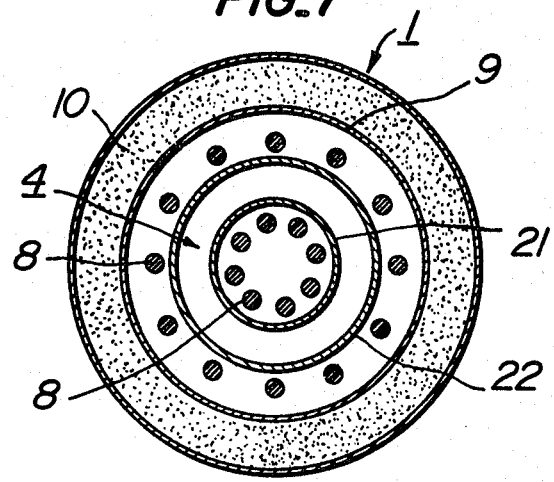

As shown in FIG. 7, the heating zone 4 may be formed by concentrically double inner and outer square or circular cylinders 21, 22 in such a manner that the distance between the outer wall of the inner cylinder 21 and the inner wall of the outer cylinder 22 corresponds to the effective heating width of 0.10–0.35 m and in this case, the heating means may be provided inside the inner cylinder 21 and outside the outer cylinder 22, respectively.

Since the annular space between the inner cylinder 21 and the outer cylinder 22 forms the heating zone 4, the starting material charged in the space is uniformly and indirectly heated from both inner and outer sides. Therefore, although the effective heating width is limited to the range of 0.10–0.35 m, if the inner and outer diameters of the annular space are increased, the area of the starting material charged in the heating zone can be made large, so that the mass production is advantageously achieved.

Figure 8:
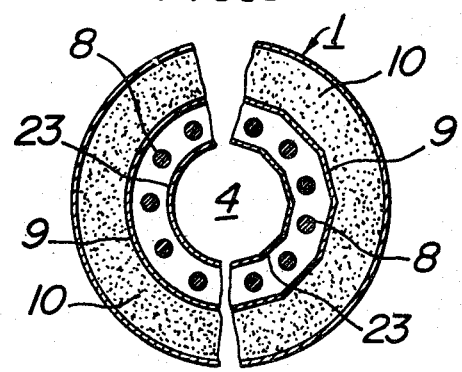

Further, as shown in FIG. 8, the heating zone 4 may be formed by a circular or polygonal cylinder 23 having a diameter corresponding to the effective heating width of 0.10–0.35 m and in this case, the heating means (8, 9) is arranged outside the cylinder 23.

In the operation of the apparatus according to the present invention, the starting material for the production of silicon carbide is charged into the top portion of the preheating zone 3 through the inlet 2 and then continuously or intermittently descended by gravity to the heating zone 4, where it is indirectly heated in horizontal direction by the electrical heating means 8, 9 to effect the formation of SiC. The descending rate U (m/hr) of the starting material at the inlet of the heating zone 4 is easily controlled by varying the recovery rate of the product and the reaction temperature is preferably controlled by adjusting the temperature of the graphite cylinder 7 defining the heating zone. Then, the reaction product is cooled in the cooling zone 5 under the non-oxidizing atmosphere during the descending by gravity and then continuously or intermittently taken out from the closable outlet 6 to obtain the product consisting mainly of β-type silicon carbide.

The high-temperature CO gas generated in the formation of SiC rises to the upper portion of the reaction vessel 1 through the preheating zone 3 and then is recovered through an exhaust pipe 17 (FIG. 3) or burnt at the outlet of the pipe 17. The sensible heat of the high-temperature CO gas is utilized to preheat the starting material because the CO gas countercurrently contacts with the starting material in the preheating zone, during which the heat exchange is substantially achieved. This is a great advantage in the continuous operation, which has never been attained by the batch operation. Further, the recovered CO gas may be used for generation of electricity, for heating, for drying and as a raw material for chemical reaction.

The following examples are given in illustration of this invention and are not intended as limitations thereof.

EXAMPLE 1

One hundred parts by weight of silica powder ($SiO_2$=99.7%, −80 mesh: 98%) was blended with 73 parts by weight of petroleum coke powder (C=98.7%, ash content=0.55%, −325 mesh: 90%) and 7 parts by weight of high pitch powder (C=50.4%, −200 mesh: 85%) and then mixed for 10 minutes by a vertical-type screw mixer. The resulting mixture had a mole ratio of $C/SiO_2$ of 3.8. The mixture was shaped into pellets by a pan-type granulator while spraying with a 2.5% aqueous solution of carbomethyl cellulose, passed through a sieve to obtain pellets having only the particle size of 5–15 mm, and then dried by a hot air heated at 150° C. in a band-type ventilating dryer for 90 minutes. The thus obtained pellets had an average particle size of 10.5 mm and a bulk specific gravity of 640 kg/m³.

Figure 9:
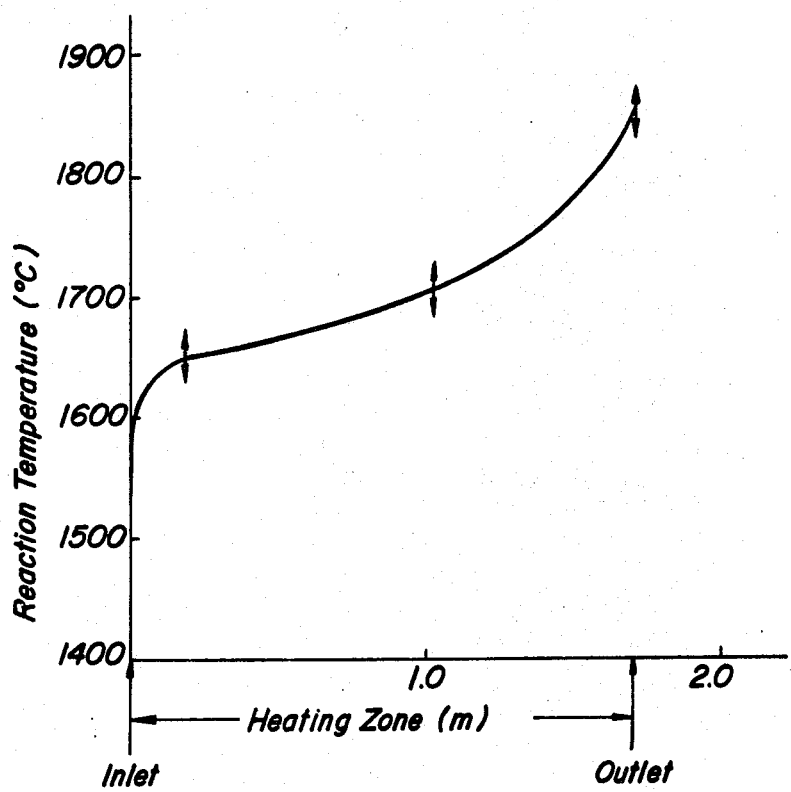
FIG. 9 is a graph showing a relation between the reaction temperature for the formation of silicon carbide and the position in the heating zone according to the present invention.

These pellets were charged into a top portion of a reaction vessel having a structure shown in FIG. 7 and specifications shown in the following Table 1 and then descended by gravity at the descending rate U of 0.85 m/hr to the heating zone, during which the formation of SiC was effected by the electrically indirect heating wherein the temperature on the outer wall of the graphite cylinder was controlled to 2,150° C. Then, the resulting reaction product was descended by gravity to the cooling zone, where it was cooled to 650° C. with the recovered CO gas and thereafter the cooled product was continuously recovered from the outlet. The retention time of the pellets in the heating zone was 138 minutes, and the yield of the product per hour was 129 kg/hr. Moreover, the reaction temperature for the formation of SiC in the heating zone was measured to obtain a result shown in FIG. 9.

The thus obtained product had a composition ratio of silicon carbide, silica and free carbon of 71.5%:5.8%:22.7% (by weight). This silicon carbide was β-type SiC containing 4.5% of α-type SiC and had a number average primary particle size of 2.8 microns.

Table 1

| | | |
|---|---|---|
| 1. | Electrically indirect heating means | Graphite heating element and graphite reflective cylinder |
| 2. | Means for recovery of product | Water-cooled rotary valve |
| 3. | Effective heating width | 0.24 m |
| 4. | Outer diameter of inner cylinder | 0.40 m |
| 5. | Inner diameter of outer cylinder | 0.88 m |
| 6. | Thickness of each of cylinder | 45 mm |
| 7. | Height of preheating zone | 0.8 m |
| 8. | Height of heating zone | 1.7 m |
| 9. | Height of cooling zone | 1.5 m |
| 10. | Material of heat insulating layer | Fine powder of carbon black |
| 11. | Thickness of heat insulating layer | 0.45 m |

EXAMPLE 2

The procedure of Example 1 was repeated by using the same silica powder, petroleum coke powder and high pitch powder as described in Example 1 except that the mole ratio of $C/SiO_2$ was varied. The thus obtained results are shown in the following Table 2.

Table 2

|  | Experiment No. | Mole ratio of $C/SiO_2$ | Composition ratio of product (%) | | | Unit power (KWH/t) |
| --- | --- | --- | --- | --- | --- | --- |
|  |  |  | SiC | $SiO_2$ | Free carbon |  |
| Present invention | 1 | 3.5 | 77.9 | 5.0 | 17.1 | 5,270 |
|  | 2 | 3.8 | 71.5 | 5.8 | 22.7 | 5,330 |
|  | 3 | 4.5 | 62.4 | 4.5 | 33.1 | 5,500 |
| Comparative example | 4 | 3.0 | 84.5 | 7.2 | 8.3 | — |
|  | 5 | 6.0 | 49.2 | 2.7 | 48.1 | 6,190 |

Note:
The unit power is an exchange value at 85% of SiC.

In the Experiment Nos. 1–3 according to the present invention, the continuous operation could be satisfactorily attained over a long time. On the contrary, in the Experiment No. 4 as a comparative example, a large amount of gas blew out after the charging of the starting material and crusts were formed at a position of about 50 cm below the charge head to prevent the descending of the starting material by gravity, so that the continuous operation was difficult. Furthermore, in the Experiment No. 5, the operation was comparatively stable, but the SiC content of the product was low and also the unit power was very high as compared with those of the Experiment Nos. 1–3.

EXAMPLE 3

One hundred parts by weight of silica granule ($SiO_2$=99.4%) obtained by pulverization of silica stone and having an average particle size of 5.8 mm and 86.4 parts by weight of charcoal (C=82.7%) having an average particle size of 4.5 mm were uniformly mixed by a V-shape mixer. The resulting mixture had a mole ratio of $C/SiO_2$ of 3.6.

The mixture was continuously charged into the same reaction vessel as described in Example 1 and descended by gravity at the descending rate U of 1.0 m/hr to the heating zone, where the formation of SiC was effected by the electrically indirect heating wherein the temperature on the outer wall of the graphite cylinder was 2,150° C. The resulting product was cooled under CO gas atmosphere in the cooling zone and then continuously taken out from the outlet. Moreover, the retention time of the mixture in the heating zone was 122 minutes and the yield of the product per hour was 119 kg/hr.

The thus obtained product had a composition ratio of silicon carbide, silica and free carbon of 76.4%:5.1%:18.5% (by weight) and consisted mainly of β-type silicon carbide like Example 1.

EXAMPLE 4

The same pellet ($C/SiO_2$=3.8) as described in Example 1 was charged into the top portion of the reaction vessel having the following specifications and the formation of silicon carbide was effected by varying the descending rate U (m/hr) of the pellet at the inlet of the heating zone to obtain a result as shown in the following Table 3.

The reaction vessel was provided with the heating means composed of the graphite heating elements and the graphite reflective cylinder and had the structure shown in FIG. 7 wherein the inner diameter of the graphite cylinder defining the heating zone was 0.24 m, the height of the heating zone was 1.2 m, the height of the preheating zone was 0.6 m, the thickness of the graphite cylinder was 35 mm, the thickness of the heat insulating layer composed of fine powder of carbon and/or graphite was 0.40 m. The temperature on the outer wall of the graphite cylinder was controlled to 2,100° C.

Table 3

|  | Experiment No. | U (m/hr) | Composition ratio of product (%) | | | Unit power (KWH/t) |
| --- | --- | --- | --- | --- | --- | --- |
|  |  |  | SiC | $SiO_2$ | Free carbon |  |
| Present invention | 1 | 0.8 | 72.4 | 4.9 | 22.7 | 6,150 |
|  | 2 | 1.1 | 62.8 | 11.7 | 25.5 | 6,380 |
| Comparative example | 3 | 0.2 | 76.1 | 1.2 | 22.7 | — |
|  | 4 | 2.0 | 29.6 | 33.5 | 36.9 | — |

Note:
The unit power is an exchange value at 85% of SiC.

In the Experiment Nos. 1 and 2 according to the present invention, the pellet and the product were smoothly descended over a long time and the continuous operation could be attained at low unit power under stable conditions notwithstanding the use of the relatively small vessel.

On the other hand, in the Experiment No. 3 as the comparative example, not only the SiC content of the product was low, but also the smooth descending movement of the starting material was obstructed by the deposition of SiO gas in 7–15 hours after the charging of the starting material, so that the continuous operation was very difficult. In the Experiment No. 4, the recovery of the product was obstructed after the charging of the starting material. When the heating zone was observed after the reaction vessel was cooled, the crystal grains of silicon carbide adhered to the inner wall of the heating graphite cylinder.

As mentioned above, according to the present invention, a lower unit power is easily obtained while maintaining the stable operation conditions over a long time as compared with the conventional process using the Acheson-type furnace and the silicon carbide consisting mainly of β-type crystal can be produced continuously and economically. Furthermore, the labor-saving, the improvement of operation environment, the recovery and reutilization of CO gas and the like can easily be achieved. Therefore, the present invention is very advantageous in industry. Moreover, the silicon carbide obtained by the process of the present invention is a homogeneous β-type crystal containing a trace amount of β-type crystal and has a fine particle size, which has never been attained in the conventional β-type silicon carbide, and excellent oxidation resistance, corrosion resistance and mechanical strength, so that it is very useful in high-density silicon carbide ceramics, silicon carbide refractorys, amorphous refractorys, graphite refractorys, various fillers, finely divided abrasive material for precision working, deoxidation and carburization agent, support for catalyst, silicon source for chemicals, and the like.

What is claimed is:

1. A process for producing silicon carbide consisting mainly of β-type crystal, comprising preparing a starting material by blending silica and carbon in a mole ratio of $C/SiO_2$ of 3.2–5.0; charging the starting material into a top portion of a vertical-type reaction vessel having a preheating zone, a heating zone and a cooling zone in this order, said heating zone having a filling width l of from 0.10 to 0.35 m; descending the charged starting material by gravity through the preheating zone to the heating zone, the descending rate U in m/hr of said charged starting material at the inlet of said heating zone being $\exp(-7.16\ l+0.39) \leq U \leq \exp(-4.63\ l+1.72)$; heating the starting material in the heating zone at a temperature of 1,600°–2,000° C. by electrically indirect heating in a horizontal direction to effect formation of silicon carbide; cooling the resulting reaction product in the cooling zone under a non-oxidizing atmosphere; and then recovering the cooled product from the bottom portion of the reaction vessel to obtain a product having a composition ratio by weight of silicon carbide, silica and free carbon which lies within the area represented by the area ABCD shown in FIG. 1 of the accompanying drawings.

2. A process as claimed in claim 1, wherein the starting material is prepared by blending silica and carbon at a mole ratio of $C/SiO_2$ of 3.4–4.5.

3. A process as claimed in claim 1, wherein the formation of silicon carbide is effected at a temperature of 1,650°–1,900° C.

4. A process as claimed in claim 1, wherein the starting material is prepared by uniformly mixing silica powder with carbon powder having a weight ratio of ash to carbon of not more than 0.07 and an average particle size of not more than 147 microns and then shaping the resulting mixture into pellets or briquettes having an average particle size of 3–18 mm.

5. A process as claimed in claim 4, wherein the pellets or briquettes are used as the starting material together with one or more of wood chip, rice hull, coconut shell, cocoa shell, charcoal granule, coke granule and coal granule.

6. A process as claimed in claim 1, wherein the starting material is prepared by mixing silica granule having an average particle size of 3–10 mm with at least one of granular charcoal having an average particle size of 2–8 mm and granular wood chip having an average particle size of 5–15 mm.